Sept. 18, 1962 — G. R. HARTING — 3,054,490
ELECTROMAGNETIC FRICTION DEVICE
Filed June 27, 1958
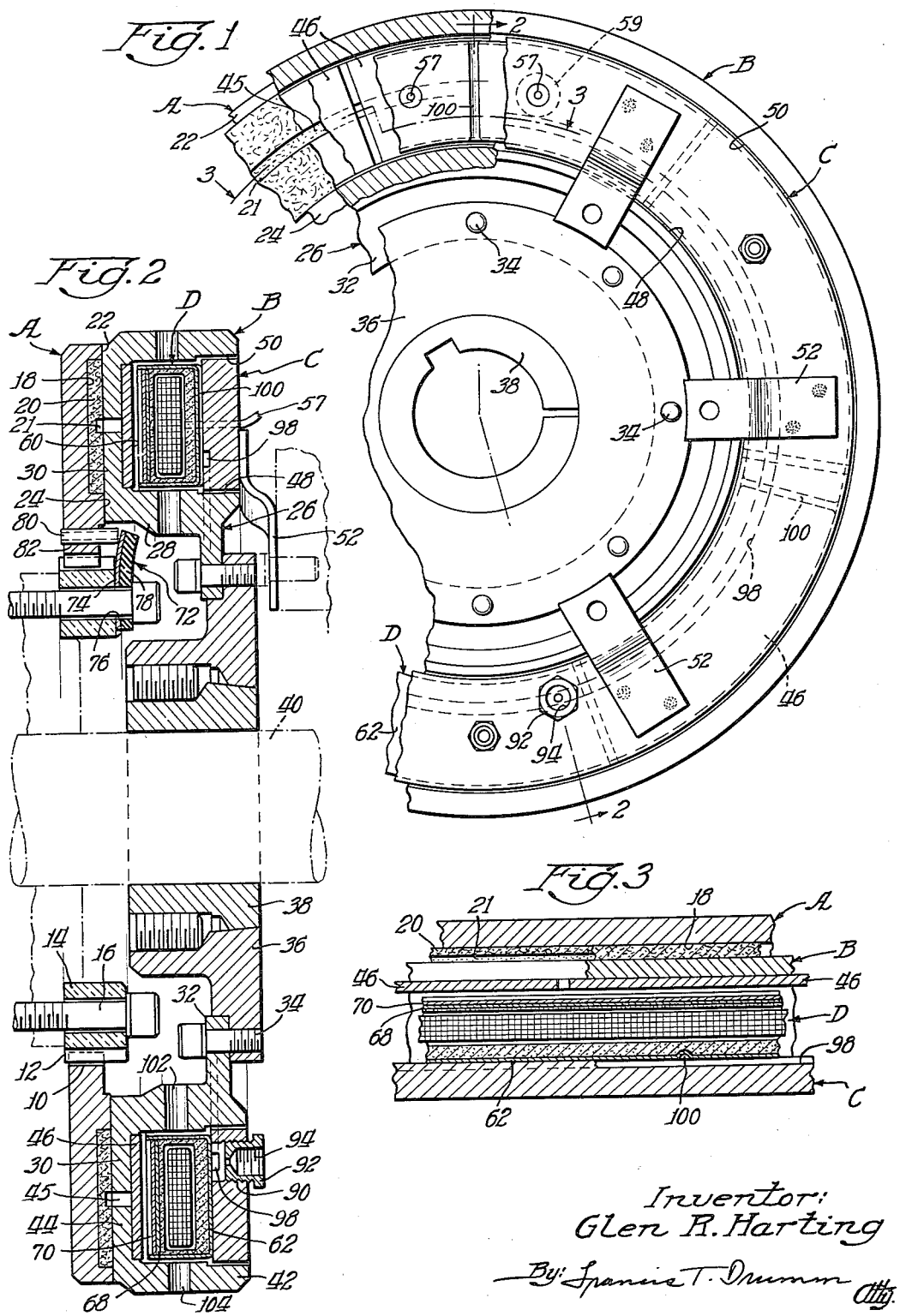
Inventor:
Glen R. Harting
By: Francis T. Drumm
Atty.

United States Patent Office 3,054,490
Patented Sept. 18, 1962

3,054,490
ELECTROMAGNETIC FRICTION DEVICE
Glen R. Harting, Rockford, Ill., assignor to Borg-Warner Corporation, Chicago, Ill., a corporation of Illinois
Filed June 27, 1958, Ser. No. 745,021
10 Claims. (Cl. 192—84)

This invention relates to electromagnetic friction devices and more particularly to a clutch or brake of the fixed coil type particularly suitable for selectively drivingly connecting a driving member and a driven member or for braking a rotatable member.

This invention is primarily directed to an electromagnetic clutch or brake having a rotor provided with radially spaced pole pieces, a fixed stator in limited spaced relation to the pole pieces and together with the pole pieces forming a chamber for a fixed coil assembly.

A principal object of the invention is to provide an electromagnetic clutch or brake in which the pole pieces are maintained in a predetermined radial relation by an impermeable shield of an uncritical radial dimension.

A further object of the invention is to provide an electromagnetic clutch or brake of the stated type wherein the impermeable shield takes the form of a plurality of individual segments secured as by brazing or the like to radially confronting flanges of the pole pieces.

Another object of the invention is to provide an electromagnetic clutch or brake of the mentioned character in which means are provided for positively effecting a circulation of air through the coil chamber.

A further object of the invention is to provide an electromagnetic clutch or brake in accordance with the preceding objects in which the stator takes the form of a relatively thick annulus having at one surface thereof an annular groove communicating with a source of compressed air, and wherein the coil is mounted within an annular casing of channel cross section provided with a plurality of radially extending grooves communicating with the groove in the surface of the stator so that cooling air flows around the coil and into heat exchange relation to the pole pieces and the shield.

A further object of the invention is to provide an electromagnetic clutch or brake of the stated type wherein the stator annulus is maintained fixed with respect to the rotatable pole pieces by means of a plurality of circumferentially spaced radially extending impermeable straps.

A further object of the invention is to provide an electromagnetic clutch or brake in accordance with the preceding objects wherein the space between the confronting flanges of the pole pieces affords an outlet for cooling air from the coil chamber.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is a fragmentary end view, partly broken away for purposes of illustration, of an electromagnetic clutch or brake made in accordance with the present invention;

FIGURE 2 is a vertical sectional view taken substantially on line 2—2 of FIGURE 1; and FIGURE 3 is a sectional view taken substantially on line 3—3 of FIGURE 1.

Referring now to the drawings and more particularly to FIGURE 1, the friction device of the present invention is herein described as taking the form of a clutch although it will be understood that it may be operated as a brake, if desired. The device comprises a driving member A, which in the present instance takes the form of an axially slidable armature of magnetic ingot iron, a driven member or rotor B, preferably of dynamo steel or the like, and a fixed stator C, of mild steel or the like, on which is mounted a coil D. The driving member A is generally annular in configuration and has at its inner periphery a plurality of teeth 10 which are in constant mesh with splines 12 of an axially fixed impermeable mounting adaptor 14 which is illustrated as being rotatable by a plurality of dowels or studs 16. Upon energization of the coil D, flux flows through the rotor B and attracts the armature A to afford a driving connection therebetween. Upon de-energization of the coil D, the armature A is moved to the left, as viewed in FIGURE 2, by means hereafter apparent, so that the driving connection between the rotor B and the armature A is terminated. The mounting adaptor 14 may be of any impermeable material but in the present instance is preferably of molded fiber or the like.

The side of the armature A confronting the rotor B is shown as provided with an annular recess 18 for reception of a correspondingly shaped friction facing 20 having an annular groove 21 for reception of wear products. The recess 18 defines a pair of radially spaced pole surfaces 22 and 24.

The rotor B includes an annular pole piece 26 having a body portion 28 at one end of which is integrally formed an outwardly extending flange 30. At the other end of the body portion 28 is an inwardly extending flange 32 secured by circumferentially spaced screws 34 to an outwardly extending flange 36 of a hub 38. The hub 38 is affixed, as by keying, splining or the like, to an output shaft 40.

The rotor B further includes an outer pole piece 42 having at one side thereof an integrally formed radial flange 44 extending into confronting relation to the flange 30 and spaced therefrom by a gap 45. It will be appreciated that the pole pieces 26 and 42 are of permeable material such as iron or the like. When the armature A is drawn into the engaged position illustrated in FIGURE 2, the left surfaces of the flanges 30 and 44 are locked into frictional engagement with the friction facing 20 and the pole surfaces 24 and 22 respectively.

According to the present invention, the pole pieces 26 and 42 are maintained in radial spaced relation by means of a plurality of circumferentially spaced connectors 46 in the form of circumferentially spaced segments of impermeable material such as stainless steel or the like, which also form a shield to assure the flow of magnetic flux from the coil D in a circular path. The several segmental connectors 46 form an interrupted annular disc. The gap 45 may be determined by relatively adjusting the flanges 30 and 44 with respect to the several segments 46. The radial dimension of each segment 46 in any event, is not critical. It will be apparent that because of the relatively limited thickness of the connectors 46, the brazing operation may be effected without distorting the pole pieces or affecting the gap between the stator and the pole pieces.

The pole piece 26 is relieved at 48 and the pole piece 42 is relieved at 50 to provide relatively smooth surfaces from which the stator C is maintained in limited spaced relation. It will be noted that the stator C is of relatively great thickness so as to resist distortion at high temperatures incident to operation. In addition, the thickness of the stator C assures a relatively wide path for the passage of flux through the pole piece 42, the armature A, the pole piece 26 and back across the surface 48 to the stator C. Since distortion is minimized, the spacing between the stator C and the pole pieces 26 and 42 may be substantially reduced and the flux loss minimized.

According to the present invention, stator C is maintained in the fixed position illustrated by means of a plurality of circumferentially spaced offset impermeable brackets 52, which are preferably, of stainless steel or stainless clad steel in order to isolate the stator from a fixed support (shown in dot-and-dash lines) on which the brackets 52 may rest. Electric current may be supplied to the coil D by means of conductors 57 suitably insulated from the stator C by means of an insulating grommet 59 (shown in dotted lines in FIGURE 1).

It will be noted that the pole pieces 26 and 42 and the stator C form a chamber 60 in which the coil D resides. The coil D is shown as being mounted within a casing 62 which is channel-shaped in cross-section and is desirably of aluminum or the like. The coil D comprises a predetermined number of turns of conductive wire such as copper or the like which are imbedded in a sealing compound such as an epoxy resin. Aluminum has a coefficient of expansion substantially identical to that of epoxy resins and consequently inadvertent ejection of the resin from the casing 62 under high temperature conditions is precluded. In the present instance, it is preferred to mix a predetermined quantity of silica sand of 150–300 mesh with the epoxy resin so that the resulting mixture may resist heat. Such a mixture, of course, is more economical than a sealing compound of resin alone.

To prevent the passage of heat from the friction facing 20 and the flanges 30 and 44 to the coil D, an annular sheet of aluminum foil 68 may be secured to the outer surface of the sealing compound and a similarly formed sheet of asbestos 70 may be superimposed thereon.

In operation, the coil D is energized and the armature A is attracted by electromagnetic flux so that it slides axially to the right, as viewed in FIGURE 2, so that the friction facing 20 and the surfaces 22 and 24 are brought into engagement with the flanges 44 and 30 of the pole pieces 42 and 26 respectively. As a result, rotary motion is imparted to the rotor B, and the shaft 40 is rotated.

Upon de-energization of the coil D, the armature A is pulled axially to the left, as viewed in FIGURE 2, by means of a plurality of retraction assemblies 72, only one of which is shown in FIGURE 2. Each retraction assembly 72 includes a radially outwardly extending flat spring 74 having an opening 76, through which one of the dowels 16 passes, and a spring stop 78. Each of the springs 74 is engaged by a hollow spring pin 80 snugly received in an opening 82 adjacent to the inner periphery of the armature A. Each spring pin 80 is dimensioned to fit within the opening 82 with adequate pressure to afford a frictional engagement just sufficient to deflect the spring 74 against the spring stop 78. By this arrangement, the armature A is moved rapidly to the left by the force of the spring 74 when the coil D is de-energized. As wear occurs on the friction surfaces, complete engagement of the armature A with the rotor B is assured because of the fact that the force of the magnetic flux exceeds the frictional force of the pins 80 in the openings 82. The pins 80 are, at all times, moved to the position illustrated in FIGURE 2 in which the springs 74 are deflected into engagement with the spring stop 78. When the friction surfaces wear, the armature A is moved to the right with respect to the pins 80 so that the left ends of the pins 80, as viewed in FIGURE 2, protrude progressively beyond the surface of the armature A.

According to another important feature of the present invention, means are provided to effect a circulation of air through the chamber 60 to dissipate the heat generated by the engagement of the friction surfaces and by the coil D. To this end, the stator C is provided with a threaded opening 90 in which is received a correspondingly threaded fitting 92 having a threaded bore 94 for reception of a suitable fitting for a conduit (not shown) from a suitable source of compressed air. For distribution of this cooling air, the inner surface of the stator C is provided with an annular groove 98 communicating with the opening 9 and the coil casing 62 is provided with a plurality of radially extending grooves 100 communicating with the groove 98. When the present clutch is engaged cooling air passes around the casing 62 and then passes through atmosphere through the spaces between the segments 46 and through the gap 45. When the armature A is in the engaged position, the air may pass radially inwardly through radial passages 102 in the pole piece 26 and radially outwardly through radial passages 104 in the pole piece 42. It will be appreciated that the cooling air under pressure is preferably applied at all times. When the coil D is de-energized, the movement of air through spaces of the segments 46 and the gap 45 assists the retraction assemblies 72 in separating the armature A from the rotor B while at the same time dissipating heat.

The above described friction device exhibits important advantages over the devices of the prior art. For instance, flow of magnetic flux in a circular path (as viewed in cross section) is assured by the segments 46. The radial dimension of these segments is not critical, and, since the coefficient of expansion of stainless steel differs from that of the mild steel of the rotor B, the segments 46 may be placed in such a manner as to assure a predetermined width of the gap 45 and thus a predetermined gap between the stator C and the surfaces 48 and 50. The segments 46 are preferably brazed in position. The cooling arrangement above-described assures a positive supply of cooling air under pressure for cooling the coil D and preventing the transmission of heat from the friction surfaces to the coil. The coil D may readily be replaced, if required, merely by effecting relative axial movement between the stator C and the rotor B.

While I have described my invention in connection with certain specific constructions and arrangements it is to be understood that this is by way of illustration and not by way of limitation and the scope of my invention is defined solely by the appended claims which should be construed as broadly as the prior art will permit.

I claim:

1. An electromagnetic friction device comprising a rotatable axially movable driving member adapted to be driven by a power source and carrying a friction facing, a rotatable driven member having radially spaced annular pole pieces, said pole pieces each having at one side a radially extending flange, said flanges extending toward each other and each having a terminating periphery in adjacent position and each flange carrying a radially disposed generally flat surface means adapted to connect said flanges for maintaining said pole pieces in radially spaced relation, said means comprising a plurality of circumferentially spaced substantially flat radially extending electromagnetically impermeable segments and said segments being arcuate and having a generally flat radially disposed surface in flush engagement with the surface of each flange, said pole pieces being radially adjustable while in engagement with said segments so that a proper spacing is provided therebetween upon securing said segments to said flanges, an annular stator interposed between said pole pieces and cooperating with said pole pieces and segments to define an annular chamber, and a coil mounted in said chamber, said coil being operative upon energization to afford a flow of electromagnetic flux through said driven member for effecting frictional engagement of said driving member and said driven member.

2. A friction device in accordance with claim 1 wherein said coil is enclosed within a casing of channel cross section, and wherein means are provided to shield said coil from frictional heat resulting from the engagement of said driving member and said driven member said means including a ring of heat resistant material cooperating with said casing to complete the enclosure of said coil.

3. A friction device in accordance with claim 2 wherein means are provided to effect a circulation of air through said chamber to cool said coil.

4. An electromagnetic friction device comprising a driving member, a driven member having radially spaced pole pieces, means for maintaining said pole pieces in radially spaced relation, said means including a plurality of circumferentially spaced substantially flat radially extending electromagnetically impermeable segments, an annular stator cooperating with said means and pole pieces to form an annular chamber, said stator being formed with an opening therethrough to receive air, a fixed coil disposed within said chamber, said coil being operative upon energization to effect frictional engagement of said driving member and said driven member, and means for introducing compressed air through said opening in said stator into said chamber to cool said coil.

5. An electromagnetic friction device comprising a rotatable axially movable driving member adapted to be driven by a power source and carrying a friction facing, a rotatable driven member having radially spaced pole pieces, each of said pole pieces having at one side thereof a radially extending flange, said flanges extending toward each other and each having a terminating periphery in adjacent position and each flange carrying a radially disposed generally flat surface means adapted to connect said flanges for maintaining the radially spaced relation of said pole pieces, said last-named means including a plurality of circumferentially spaced substantially flat radially extending electromagnetically impermeable segments secured to said surfaces of said flanges, said segments being arcuate and having a generally flat radially disposed surface in flush engagement with the surface of each flange, said pole pieces being radially adjustable while in engagement with said segments so that a proper spacing is provided therebetween upon securing said segments to said flanges, an annular stator cooperating with said last-named means and said pole pieces to form an annular chamber, circumferentially spaced support means for maintaining said stator in a fixed position, a fixed coil disposed within said chamber, said coil being operative upon energization to effect frictional engagement of said driving member and said driven member, and means for introducing compressed air into said chamber to cool said coil.

6. An electromagnetic friction device in accordance with claim 5 wherein said coil is provided with a casing of channel cross-section, wherein said casing is secured to the inner surface of said stator and wherein said casing is provided with a plurality of radially extending grooves to circulate the compressed air around said coil.

7. An electromagnetic friction device comprising an axially movable first member adapted to be driven by a power source, said first member having a friction facing, a second member having a pair of radially spaced pole pieces, one of said pole pieces having at one side thereof a radially inwardly extending flange, the other of said pole pieces having at one side thereof a radially outwardly extending flange, said flanges extending into limited spaced relation, means including a plurality of circumferentially spaced substantially flat radially extending electromagnetically impermeable segments secured to said flanges for maintaining the spaced relation of said pole pieces, an annular stator mounted in limited spaced relation to said pole pieces at the other ends thereof, circumferentially spaced offset electromagnetically impermeable bracket means for maintaining said stator in a fixed position, said stator cooperating with said flanges and said segments to define an annular chamber, an annular coil having a casing of channel cross section secured to the inner surface of said stator, said coil being operative upon energization to effect a flow of electromagnetic flux through said pole pieces and said first member to afford frictional engagement of said first member and said second member, means for introducing air under pressure greater than atmospheric into said chamber to cool said coil, said means including means defining an opening in said stator, an annular groove on the inner surface of said stator, a plurality of radially extending grooves in the surface of said coil casing communicating with said annular groove and the stator opening whereby air is distributed throughout said chamber to cool said coil, a plurality of radial openings in said first member and said second member for exhausting air from said chamber, and means for retracting said first member from said second member upon de-energization of said coil, said last-named means being capable of effecting a progressive relative advancement of said first member with respect to said second member so that effective frictional engagement is assured even in the event of wear of the friction facing.

8. An electromagnetic friction device comprising an annular armature adapted to be driven by a power source, an output member selectively adapted to be driven by said armature, said armature having a splined inner periphery, an impermeable annular adaptor having a splined outer periphery for sliding reception of said armature, said output member comprising a first pole piece having at one side thereof a radially inwardly extending annular flange, a second pole piece having a radially outwardly extending annular flange, means secured to said flanges for maintaining said pole pieces in a predetermined spacial relation, said means including a plurality of segments of electromagnetically impermeable material in limited circumferential spaced relation each to the other and forming an interrupted ring, a stator at the other end of said pole pieces cooperating with said flanges and said segments to form an annular chamber, a plurality of circumferentially spaced electromagnetically impermeable brackets for maintaining said stator in limited spacial relation to said pole pieces, a coil secured to the inner surface of said stator within said chamber, said coil being received within a casing of channel cross-section and being operative upon energization to effect a flow of electromagnetic flux through said pole pieces so that said armature is moved axially along said adaptor into frictional engagement with the flanges of said pole pieces, means for precluding the transmission of heat from said flanges to said coil, said last-named means including a ring of metal foil and a ring of asbestos interposed between said coil and said flanges, means for introducing cooling air under pressure into said chamber for cooling said coil, said means including means defining an opening in said stator, an annular groove on the inner surface of said stator, a plurality of radial grooves in said coil casing communicating with said annular groove in said stator so that communication is afforded between a suitable source of compressed air and the surfaces of said coil casing, and retraction means for separating said armature from said pole pieces upon de-energization of said coil, said last-named means including a plurality of circumferentially spaced retraction assemblies, each of said assemblies including a flat spring secured to one side of said adaptor, stop means extending at an angle to said adaptor, means defining an opening in said armature at the inner marginal edge thereof, spring means frictionally received in said opening, said spring means being adapted to deflect said flat spring to the limit position thereof upon movement of said armature to the engaged position, said spring means being relatively movable with respect to said armature to compensate for wear at the friction surfaces of said armature and said output member.

9. An electromagnetic friction device comprising an annular armature adapted to be driven by a power source, an output member selectively adapted to be driven by said armature, said armature having a splined inner periphery, an impermeable annular adaptor having a splined outer periphery for sliding reception of said armature, said output member comprising a first pole piece having at one side thereof a radially inwardly extending annular flange, a second pole piece having a radially outwardly extending annular flange, means secured to said flanges for maintaining said pole pieces in a predetermined spacial relation, said means including a plurality of segments of electromagnetically impermeable material in limited circumferential spaced relation each to the other and forming an interrupted ring, a stator at the other end of said pole pieces cooperating with said flanges and said segments to form an annular chamber, a plurality of circumferentially spaced electromagnetically impermeable brackets for maintaining said stator in limited spacial relation to said pole pieces, a coil secured to the inner surface of said stator within said chamber, said coil being received within a casing of channel cross-section and being operative upon energization to effect a flow of electromagnetic flux through said pole pieces so that said armature is moved axially along said adaptor into frictional engagement with the flanges of said pole pieces, means for introducing cooling air under pressure greater than atmospheric into said chamber for cooling said coil, said means including means defining an opening in said stator, an annular groove on the inner surface of said stator, a plurality of radial grooves in said coil casing communicating with said annular groove in said stator so that communication is afforded between a suitable source of air under pressure greater than atmospheric and the surfaces of said coil casing, and retraction means for separating said armature from said pole pieces upon de-energization of said coil, said last-named means including a plurality of circumferentially spaced retraction assemblies, each of said assemblies including a flat spring secured to one side of said adaptor, stop means extending at an angle to said adaptor, means defining an opening in said armature at the inner marginal edge thereof, spring means frictionally received in said opening, said spring means being adapted to deflect said flat spring to the limit position thereof upon movement of said armature to the engaged position, said spring means being relatively movable with respect to said armature to compensate for wear at the friction surfaces of said armature and said output member.

10. A friction device in accordance with claim 5 wherein said driving member has a recessed friction facing and wherein said friction facing is formed with an annular groove in register with the gap between said flanges to receive wear products.

References Cited in the file of this patent

UNITED STATES PATENTS

| | | |
|---|---|---|
| 1,746,365 | Schunemann | Feb. 11, 1930 |
| 2,107,954 | Morton et al. | Feb. 8, 1938 |
| 2,267,114 | Lear et al. | Dec. 23, 1941 |
| 2,580,869 | Winther | Jan. 1, 1952 |
| 2,684,744 | Myers | July 27, 1954 |
| 2,738,044 | Winther | Mar. 13, 1956 |
| 2,739,684 | Meyer | Mar. 27, 1956 |
| 2,753,032 | Eason | July 3, 1956 |
| 2,765,891 | Pierce | Oct. 9, 1956 |
| 2,801,719 | Clerk | Aug. 6, 1957 |
| 2,808,917 | Harter | Oct. 8, 1957 |
| 2,844,230 | Armstrong | July 22, 1958 |
| 2,853,291 | Adam | Sept. 23, 1958 |
| 2,919,776 | Pierce | Jan. 5, 1960 |
| 3,007,561 | Harting | Nov. 7, 1961 |

FOREIGN PATENTS

| | | |
|---|---|---|
| 575,996 | Great Britain | Mar. 14, 1946 |